US012747650B2

(12) United States Patent
Brauti et al.

(10) Patent No.: US 12,747,650 B2
(45) Date of Patent: Sep. 29, 2026

(54) SUBSEA ACTUATION SUB-SYSTEM

(71) Applicant: TechnipFMC Norge AS, Kongsberg (NO)

(72) Inventors: Espen Brauti, Kongsberg (NO); Stig Mathisen, Kongsberg (NO); Deviprasad M S Bhat, Kongsberg (NO); Heyn H. Magnus, Kongsberg (NO)

(73) Assignee: TechnipFMC Norge AS, Kongsberg (NO)

( * ) Notice: Subject to any disclaimer, the term of this patent is extended or adjusted under 35 U.S.C. 154(b) by 0 days.

(21) Appl. No.: 18/998,475

(22) PCT Filed: Jul. 25, 2023

(86) PCT No.: PCT/EP2023/070522
§ 371 (c)(1),
(2) Date: Jan. 25, 2025

(87) PCT Pub. No.: WO2024/023057
PCT Pub. Date: Feb. 1, 2024

(65) Prior Publication Data

US 2026/0043313 A1 Feb. 12, 2026

(30) Foreign Application Priority Data

Jul. 26, 2022 (NO) .................................... 20220826

(51) Int. Cl.
*E21B 41/00* (2006.01)
*F16K 31/53* (2006.01)
*F16K 37/00* (2006.01)

(52) U.S. Cl.
CPC .......... *E21B 41/0007* (2013.01); *F16K 31/53* (2013.01); *F16K 37/0041* (2013.01)

(58) Field of Classification Search
CPC ... E21B 41/0007; F16K 31/53; F16K 37/0041
See application file for complete search history.

(56) References Cited

U.S. PATENT DOCUMENTS 450,451 A 4/1891 Ferrell
3,538,948 A * 11/1970 Nelson ................ F16K 37/0041 340/687

(Continued)

FOREIGN PATENT DOCUMENTS

EP 3492788 A1 * 6/2019 ......... F16K 37/0008
EP 3699467 A1 8/2020
EP 3492788 B1 * 11/2020 ............... F16D 7/00

OTHER PUBLICATIONS

International Search Report and Written Opinion for Application No. PCT/EP2023/070522, dated Oct. 25, 2023.

(Continued)

*Primary Examiner* — James G Sayre
(74) *Attorney, Agent, or Firm* — Kevin E. West; Advent, LLP

(57) ABSTRACT

A subsea actuation sub-system comprising a position indicator and a rotation-to-linear mechanism is disclosed. The rotation-to-linear mechanism being fixable to a subsea structure comprising a valve with a valve stem, and being connectable to the valve stem of the valve for moving the valve between an open position and a closed position, the rotation-to-linear mechanism comprising a shaft with an end for receiving rotational input from a separate retrievable motor actuator, the end being positioned within a cylindrical bucket, the bucket comprising a cylindrical opening in an axial direction of the bucket and a through opening, in a radial direction, in a side of the bucket, the shaft extending through a bottom of the bucket to the rotation-to-linear mechanism. The position indicator indicating the position of the output movement of the rotation-to-linear mechanism on (Continued)

the valve stem, the position indicator being arranged to interact with the shaft within the bucket.

18 Claims, 5 Drawing Sheets

(56) References Cited

U.S. PATENT DOCUMENTS

| | | | | | |
|---|---|---|---|---|---|
| 3,671,692 | A * | 6/1972 | Potter | F16K 37/0041 137/554 |
| 4,759,386 | A * | 7/1988 | Grouw, III | F16K 37/0041 137/554 |
| 5,156,185 | A * | 10/1992 | Lester | F16K 37/0041 137/554 |
| 5,538,037 | A | 7/1996 | Piz ao | |
| 6,237,626 | B1 | 5/2001 | Wilkins | |
| 9,920,842 | B1 | 3/2018 | Karani | |
| 2005/0173667 | A1 | 8/2005 | Zheng | |
| 2012/0234410 | A1 | 9/2012 | Borchgrevink et al. | |

OTHER PUBLICATIONS

Norwegian Office action in patent application No. 20220826, dated Jan. 31, 2023.

* cited by examiner

SUBSEA ACTUATION SUB-SYSTEM

TECHNICAL FIELD

The present disclosure relates to a subsea actuation sub-system comprising a position indicator and a rotation-to-linear mechanism. More particularly, the present disclosure relates to a system that indicates a valve position subsea used in the oil and gas industry.

BACKGROUND

A subsea actuation system is used for operating a valve on a valve assembly, such as a subsea Christmas (X-mas) tree. A retrievable actuator is used to connect to the subsea actuation system to operate the valve. The subsea actuation system has a position indicator indicating a position of the valve, for example, if the valve is open or closed. This position indicator should be visible from a remotely operated vehicle, ROV, operating the retrievable actuator. It is desirable to be able to know reliably and to indicate clearly the position of the valve.

A further problem is that such position indication takes place subsea, possibly at several thousand meters depth. This results in further problems such as high pressures, water current, darkness, presence of water, poor visibility, etc. The position indicator must also comply with regulations and standards in the oil and gas industry.

A further technical problem is that any part of the position indicator and its operation and replacement must function without the possibility of failing, fulfill technical and legal requirements, and be easy to use. It is desirable that any solution is simple, not expensive to produce, and reliable. It is further a technical problem to avoid cumbersome arrangements that are expensive to manufacture or assemble.

SUMMARY

According to embodiments of the present disclosure, a subsea actuation subsystem comprising a position indicator and a rotation-to-linear mechanism is disclosed herein. This can be achieved by the features as defined by the independent claims. Further enhancements are characterized by the dependent claims. The embodiments are further defined by the claims.

According to one embodiment, a subsea actuation sub-system comprises a position indicator and a rotation-to-linear mechanism. The rotation-to-linear mechanism is fixable to a subsea structure comprising a valve with a valve stem, and is connectable to the valve stem of the valve for moving the valve between an open position and a closed position. The rotation-to-linear mechanism comprises a shaft with an end for receiving rotational input from a separate retrievable motor actuator, the end is positioned within a cylindrical bucket. The bucket comprises a cylindrical opening in an axial direction of the bucket and a through opening, in a radial direction, in a side of the bucket. The shaft extends through a bottom of the bucket to the rotation-to-linear mechanism. The position indicator indicates the position of the output movement of the rotation-to-linear mechanism on the valve stem, and the position indicator is arranged to interact with the shaft within the bucket. The position indicator comprises a first gear and a second gear, the two gears converting the rotation of the shaft to a visual position indicator element outside the bucket. The first gear is arranged on the shaft. The second gear comprises an element. The position of the linear movement of the rotation-to-linear mechanism is indicated by the element. Further enhancements are characterized by the dependent claims.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any claimed embodiment may be technically combined with any other claimed embodiment or embodiments.

BRIEF DESCRIPTION OF THE DRAWINGS

The accompanying drawings illustrate presently example embodiments of the disclosure and serve to explain, by way of example, the principles of the disclosure.

DETAILED DESCRIPTION

Figure 1:
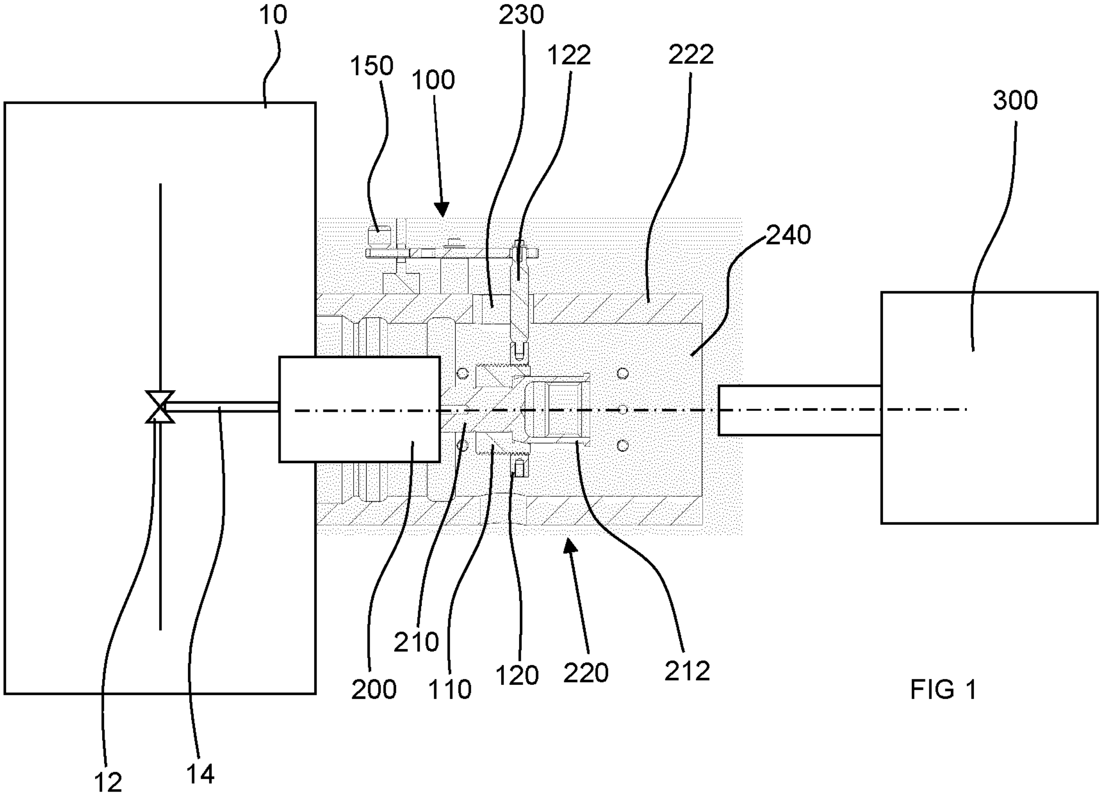
FIG. 1 is a diagrammatic illustration of a subsea actuation sub-system according to an example embodiment of the disclosure.

All illustrated embodiments use two gears. FIGS. 1 to 5 illustrate example embodiments of the subsea actuation sub-system. FIGS. 1 to 5 illustrate an example embodiment where the two gears comprise a threaded spindle and a saddle nut. FIGS. 6 to 10 illustrates example embodiments of another embodiment of the subsea actuation sub-system. FIGS. 6 to 10 illustrate an example embodiment where the two gears comprise two spur gears. Two helical gears may be used instead of the two spur gears.

All embodiments described herein comprise the position indicator 100 arranged in between the separate retrievable motor actuator 300 and the rotation-to-linear mechanism 200. The position indicator 100 measures the rotation of the shaft 210 through threads of the first gear 110 on the shaft 210, and subsequent gears. The position indicator 100 gives an indication on how much the shaft 210 rotates and, in turn, has moved the valve stem 14 of the valve 12. The position indicator 100 indicates, therefore, the position of the valve 12, for example, if the valve 12 is open, closed, or in a position between.

With reference to FIG. 1, there is shown an example embodiment of a subsea actuation sub-system with a position indicator 100 and a rotation-to-linear mechanism 200. The rotation-to-linear mechanism 200 is fixable to a subsea structure 10 comprising a valve 12 with a valve stem 14. In embodiments, the subsea structure 10 is a subsea X-mas tree, a manifold or the like. In embodiments, the valve 12 is a master valve, a wing valve, a swab valve, a choke valve, a gate valve, or the like. In embodiments the valve stem 14 is a rising valve stem 14. The rotation-to-linear mechanism 200 is connectable to the valve stem 14 of the valve 12 for moving the valve 12 between an open position and a closed position. The rotation-to-linear mechanism 200 comprises a shaft 210 with an end 212 for receiving rotational input from a separate retrievable motor actuator 300. The end 212 is positioned within a cylindrical bucket 220. The bucket 220 comprises a cylindrical opening 240 in an axial direction of the bucket 220 and a through opening 230, in a radial direction, in a side 222 of the bucket 220. In embodiments, the through opening 230 is an elongate through opening 230. The through opening 230 goes through the side 222 of the bucket 220. The shaft 210 extends through a bottom of the bucket 220 to the rotation-to-linear mechanism 200. The bottom of the bucket 220 is opposite the cylindrical opening 240. The shaft 210, or the shaft 210 and the rotation-to-linear mechanism 200, extends through a bottom of the bucket 220 to connect to and operate the valve stem 14.

The position indicator 100 indicates the position of the output movement of the rotation-to-linear mechanism 200 on the valve stem 14. The position indicator 100 is arranged to interact with the shaft 210 within the bucket 220.

The position indicator 100 comprises a first gear 110 and a second gear 120, the two gears converting the rotation of the shaft 210 to a visual position indicator element 150 outside the bucket 220. The first gear 110 is arranged on, connectable to, the shaft 210. The second gear 120 comprises an element 122. The position of the linear movement of the rotation-to-linear mechanism 200 is indicated by the element 122. That is, the rotational movement that is converted into a linear movement by the rotation-to-linear mechanism 200 operates the valve 12 via the valve stem 14. That rotation is indicated by the element 122, and therefore the position of the valve 12 is indicated. The indication may be a closed valve 12, or open valve 12, or any position therebetween of the valve 12.

With reference to FIG. 1, there is shown an example embodiment of a subsea actuation sub-system where the element 122 extends through the elongate opening 230. This allows the position of the valve 12 to be indicated on the outside of the bucket 220. The position indicator 100 converts rotational movement into linear movement and indicates the position of the valve 12. The position of the valve 12 relates to the linear movement, the position, of the valve stem 14 caused by the movement of the rotation-to-linear mechanism 200 on the valve stem 14. The rotational movement that is inputted to the rotation-to-linear mechanism 200, by the separate retrievable motor actuator 300, is converted to linear movement operating the valve 12. This linear movement of the valve 12 is indicated by the position indicator 100. The position indicator 100 is arranged to interact with the rotating shaft 210 within the bucket 220, the linear movement indicating an amount of rotational movement of the shaft 210. The linear movement is indicated by the element 122 extending through the elongate opening 230. In embodiments, at least a part of the shaft 210 is inside the bucket 220 and arranged so that the separate retrievable motor actuator 300 can access the shaft 210 through the cylindrical opening 230 of the bucket 220.

Figure 2:
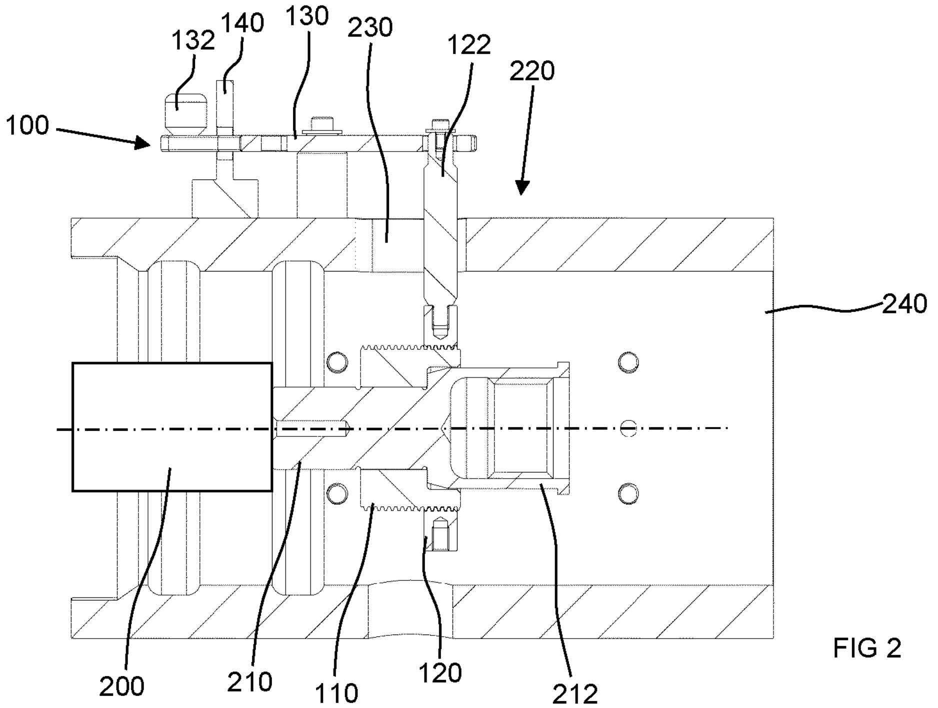
FIG. 2 is a diagrammatic illustration of a subsea actuation sub-system according to an example embodiment of the disclosure.
Figure 3:
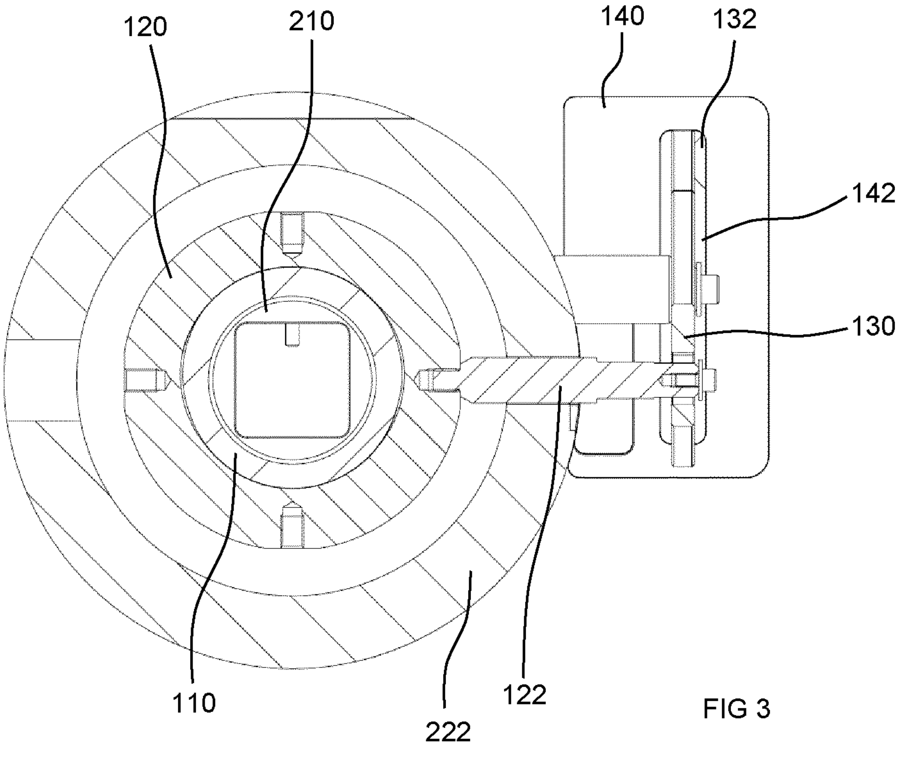
FIG. 3 is a diagrammatic illustration of a subsea actuation sub-system according to an embodiment of the disclosure according to a radial cut through the bucket.

As may best be taken from FIGS. 1 to 3, in embodiments, the first gear 110 is a threaded spindle 110 arranged on the shaft 210 and the second gear 120 is a saddle nut 120 around the threaded spindle 110. In embodiments, the saddle nut 120 rides on the threaded spindle 110. In embodiments, rotational movement of the shaft 210 is translated into linear movement of the saddle nut 120. In embodiments, the element 122 is connected, arranged on, the saddle nut 120. In embodiments, the element 122, extending through a side wall 222 of the bucket 220, itself indicates the position of the valve 12. In embodiments, the element 122 is connected to a further indicator that indicates the position of the valve 12.

With reference to FIGS. 1 to 3, in embodiments, the first gear 110 and the second gear 120 are within the bucket 220. In embodiments, the first gear 110 and the second gear 120 are arranged inside the bucket 220. In embodiments, the threaded spindle 110 and the saddle nut 120 are arranged inside the bucket 220. In embodiments, the two gears are inside the bucket 220 converting the rotation of the shaft 210 to a visual position indicator element outside the bucket 220.

According to one embodiment, the subsea actuation sub-system comprises a spindle drive, the treaded spindle 110 drives the saddle nut 120, and the saddle nut 120 indicates the linear movement of the valve 12. This results in a small opening 230 in the bucket 220. In embodiments, the small movement of the saddle nut 120 is enlarged by an additional mechanism, such as a swing 130. This allows better positioning indication of the amount of rotation of the shaft 210 of the rotation-to-linear mechanism 200. It is important to keep the radial through opening 230 in the bucket 220 small because of the rotational force, the high moment, transferred by the retrievable motor actuator 300 onto the bucket 220.

With reference to FIGS. 1 to 5, in embodiments, the position indicator 100 further comprises a swing 130 pivotably arranged on the bucket 220. In embodiments, the element 122 extends through a slot 134 in the swing 130, and the swing 130 comprises an indicator 132. In embodiments, the swing 130 is a plate arranged and rotatably supported on the bucket 220. In embodiments, the swing, at one end, has the indicator 132, and opposite thereof has the slot 134. In embodiments, the slot 134 is semi-circular in shape and the slot 134 goes through the swing 130 to allow the element 122 to swing the swing 130 as the element 122 moves in the slot 134. Hereby, the small linear movement of the element 122 is translated into a larger visible indicator 132. The indicator 132 indicates thus the position of the valve 12. In embodiments, the visual position indicator element 150 is the indicator 132.

Figure 4:
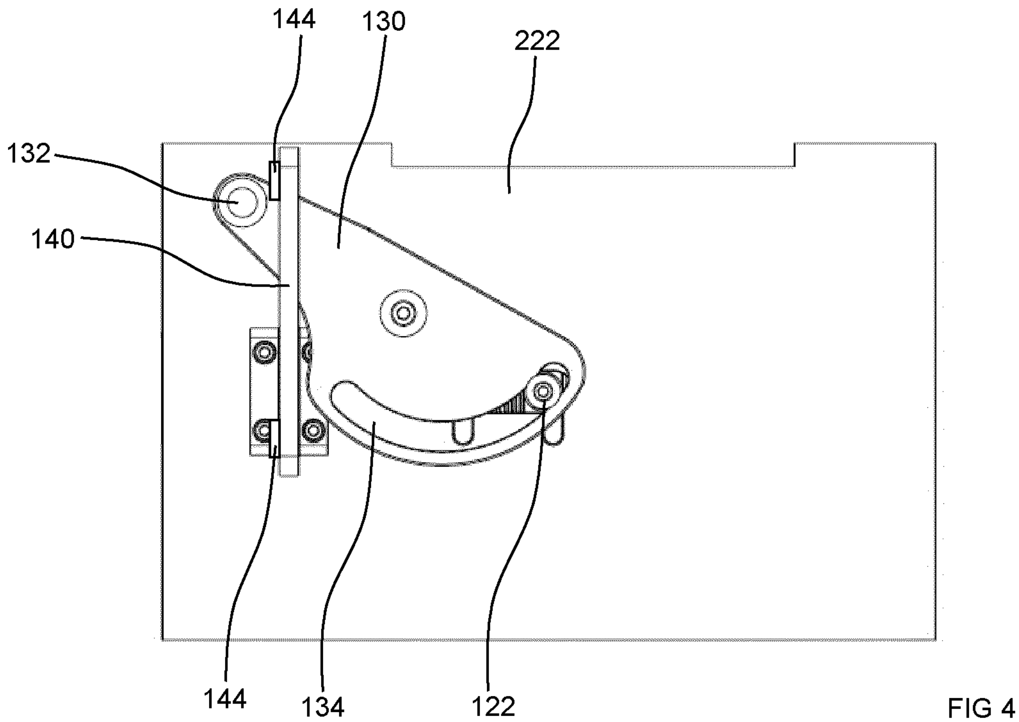
FIG. 4 is a diagrammatic illustration of a subsea actuation sub-system according to an example embodiment of the disclosure.
Figure 5:
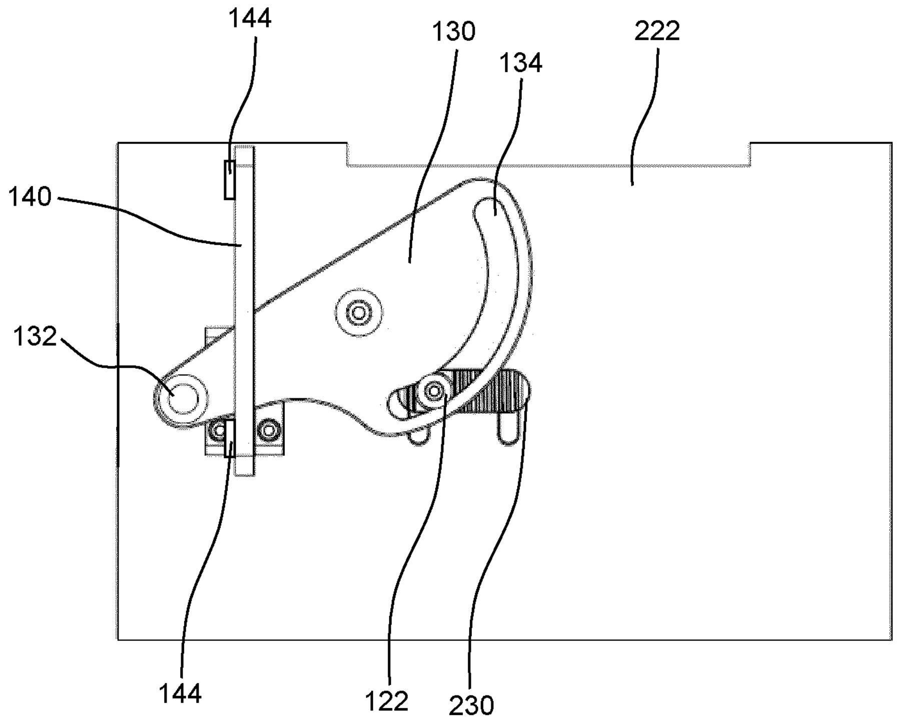
FIG. 5 is a diagrammatic illustration of a subsea actuation sub-system according to an example embodiment of the disclosure.
Figure 6:
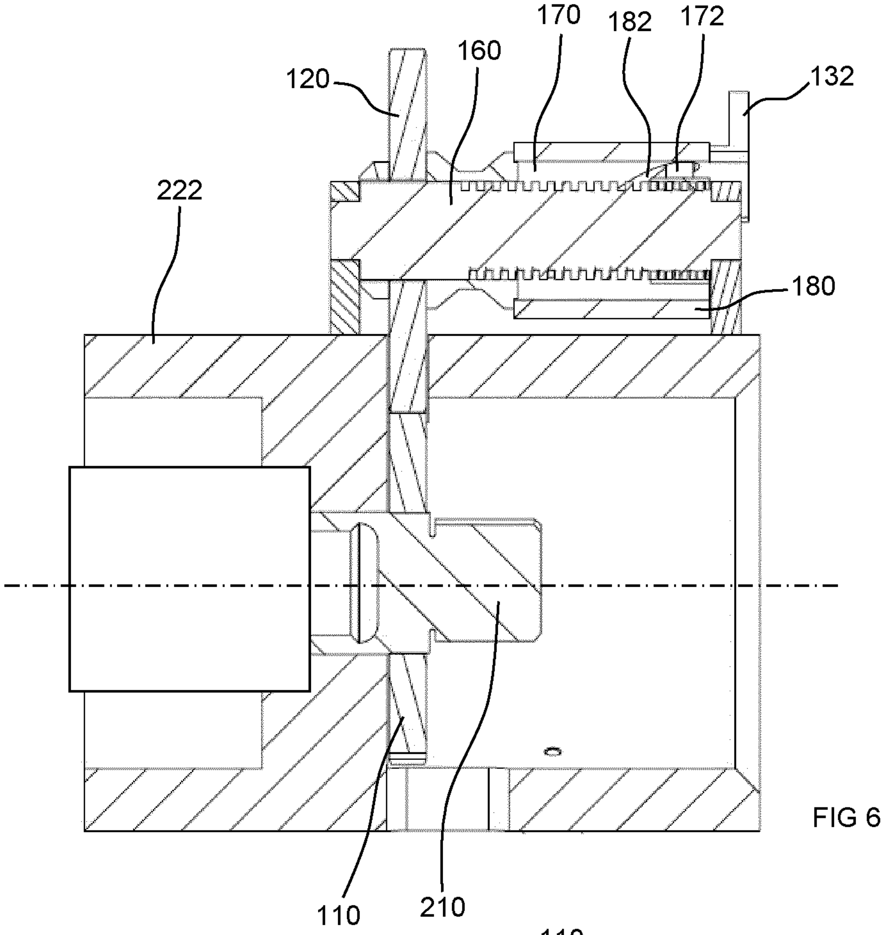
FIG. 6 is a diagrammatic illustration of a subsea actuation sub-system according to another example embodiment of the disclosure.

With reference to FIGS. 1 to 5, in embodiments, the position indicator 100 further comprises a guide 140 attached to the bucket 220. In embodiments, the guide 140 comprises a slit 142. In embodiments, the swing 130 extends through the slit 142 with the indicator 132 on one side of the slit 142 and the slot 134 on the other side of the slit 142. In embodiments, the guide 140 guides the swing 130. FIG. 4 shows the indicator 132 in an upper position while FIG. 5 shows the indicator 132 in a lower position. These two positions would represent open and closed valve 12 positions.

According to one embodiment, the guide 140 comprises one or more sensors 144 for sensing the presence of the indicator 132. In addition, or as an alternative, the guide 140 comprises one or more sensors 144 for sensing the presence of the swing 130. In this way, the position of the valve is detected electronically with the one or more sensors 144.

According to one embodiment, the indicator 132 protrudes perpendicular to the swing 130 and is coloured differently from a colour of the swing 130 or the bucket 220. This allows a good detection of the position of the indicator 132. This makes it easy to see the indicator 132 and hence the position of the valve 12.

According to one embodiment, the guide 140 is arranged to the bucket 220 and the guide 140 supports the swing 130. In embodiments, the guide 140 is arranged to be attachable to the bucket 220, and the guide 140 supports the swing 130 so that the swing 130 does not need to be attached to the bucket 220. In some embodiments, only the guide 140 supports the swing 130.

According to one embodiment, the first gear 110 is arranged connectable to the shaft 210, such that the first gear 110 is connectable to, and removable from, the shaft 210. In this way, the first gear may be replaced if necessary.

According to one embodiment, the element 122 is attachable to the second gear 120 by a screw connection or by a quick connect coupling. In embodiments, the quick connect coupling is a snap fitting, for example, a flexible element that fits into a groove and locks the element 122 to the second gear 120. In this way, the element 122 may be attached to, or detached from, the second gear 120.

Figure 7:
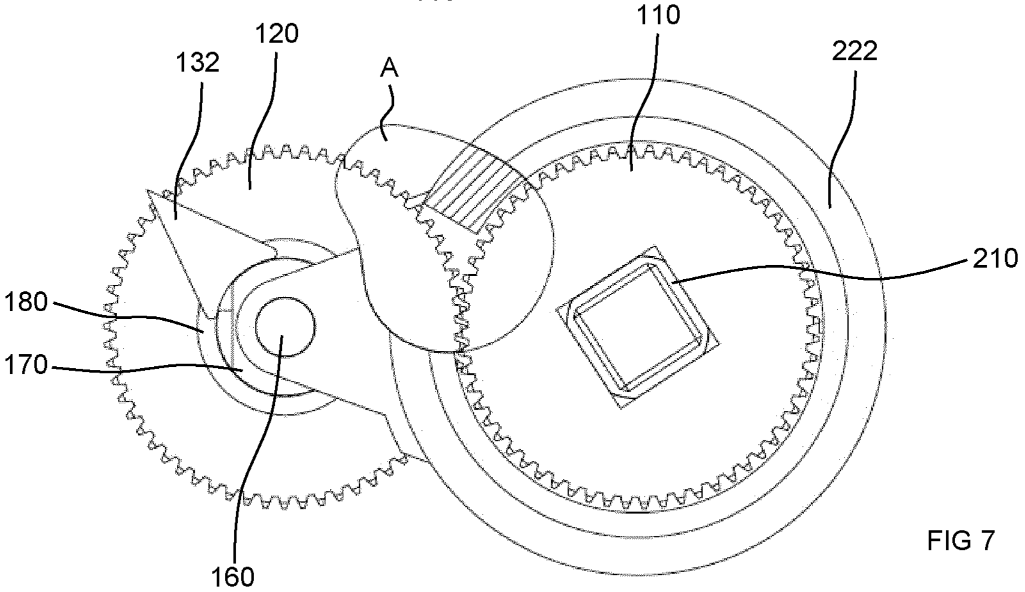
FIG. 7 is a diagrammatic illustration of a subsea actuation sub-system according to an example embodiment of the disclosure, with a partial cut-out A over parts of the two cog wheels and bucket.
Figure 8:
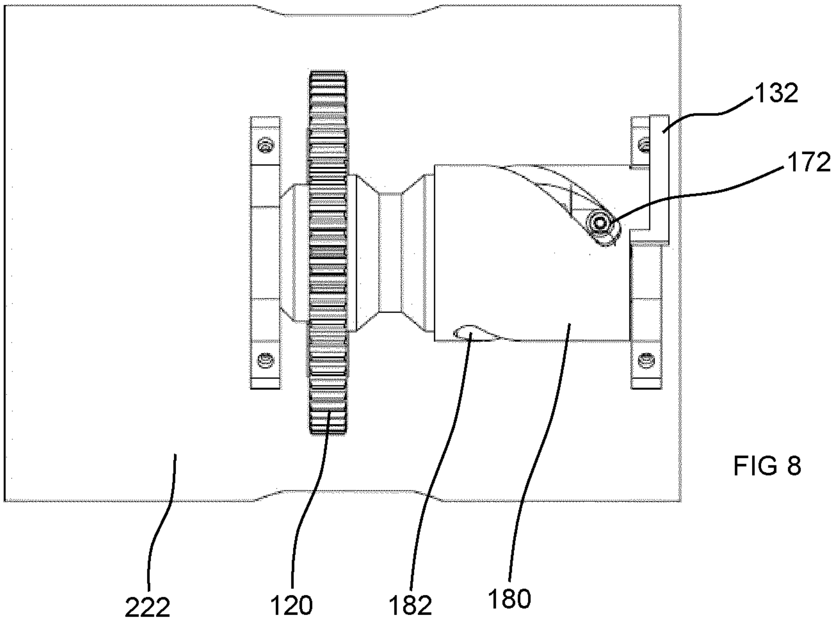
FIG. 8 is a diagrammatic illustration of a subsea actuation sub-system according to an example embodiment of the disclosure.

With reference to FIGS. 6 to 10, in embodiments, the first gear 110 is a first spur gear 110 on the shaft 210. In embodiments, the second gear 120 is a second spur gear 120 meshing with the first spur gear 110. In embodiments, the second gear 120 takes the rotational movement outside the bucket 220. In embodiments, the second gear 120 rotates, directly or indirectly, the visual position indicator element 132. In some embodiments, the visual position indicator element 132 is a dial. In embodiments, the axis of the second gear 120 is arranged parallel with the bucket 220, and the axis is arranged on the outside of the bucket 220. FIG. 7 illustrates the two spur gears 110, 120 and shows in a cut-out section A how they mesh with each other.

According to one embodiment, the position indicator 100 further comprises a threaded spindle 160 and a saddle nut 170 around the threaded spindle 160. In embodiments, the threaded spindle 160 is rotated by the second gear 120 and the saddle nut 170 is prevented from rotating and rides linearly along the threaded spindle 160.

According to one embodiment, the position indicator 100 further comprises a peg 172 arranged on the saddle nut 170. In embodiments, the peg 172 runs in a sleeve opening 182 in a sleeve 180 arranged around the saddle nut 170. In embodiments, the saddle nut 170 and the peg 172 move linearly, for example, parallel to the axis of the bucket 220, while the sleeve 180 rotates.

Figure 9:
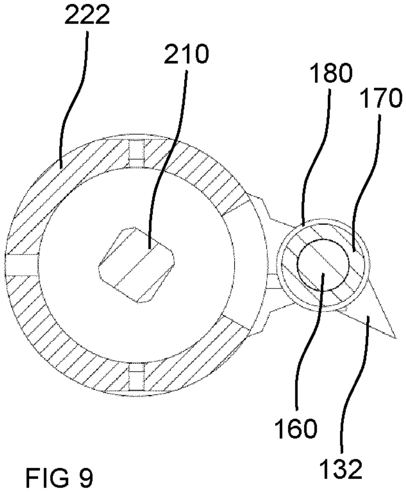
FIG. 9 is a diagrammatic illustration of a subsea actuation sub-system according to an example embodiment of the disclosure.
Figure 10:
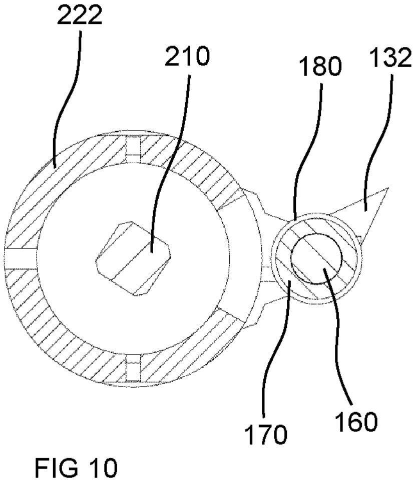
FIG. 10 is a diagrammatic illustration of a subsea actuation sub-system according to an example embodiment of the disclosure.

According to one embodiment, the saddle nut 170 is prevented from rotating and the sleeve 180 rotates as the peg 172 runs in the sleeve opening 174 when the saddle nut 170 moves linearly. In embodiments, the sleeve 180 comprises the visual position indicator element 132. In some embodiments, the visual position indicator element 132 is a dial. FIGS. 9 and 10 illustrate parts of the subsea actuation sub-system with a radial cut through the bucket 220 and not showing the two gears 110, 120. FIG. 9 shows the indicator 132 in a lower position, while FIG. 5 shows the indicator 132 in an upper position. These two positions would represent open and closed valve 12 positions.

According to one embodiment, the separate retrievable motor actuator 300 is operated only by electric power. In embodiments, the retrievable actuator 300 is handled by a ROV and comprises batteries and an electric rotational motor. In embodiments, the retrievable actuator 300 is connectable to the valve stem 14 via the shaft 210, and also connectable to the bucket 220 to counteract the moment transferred to the valve stem 14.

As illustrated in FIGS. 6 to 10, the following alternative embodiments are disclosed. According to an embodiment, the subsea actuation sub-system is such that the first gear 110 is a first spur gear 110 on the shaft 210, the second gear 120 is a second spur gear 120 meshing with the first spur gear 110, the second gear 120 taking the rotational movement outside the bucket 220, the second gear 120 rotating, directly or indirectly, the visual position indicator element 132.

According to an embodiment, the subsea actuation sub-system is such that the position indicator 100 further comprises a threaded spindle 160 and a saddle nut 170 around the threaded spindle 160.

According to an embodiment, the subsea actuation sub-system is such that the position indicator 100 further comprises a peg 172 arranged on the saddle nut 170, the peg 172 running in a sleeve opening 182 in a sleeve 180 arranged around the saddle nut 170.

According to an embodiment, the subsea actuation sub-system is such that the saddle nut 170 is prevented from rotating and the sleeve 180 rotates as the peg 172 runs in the sleeve opening 182 when the saddle nut 170 moves linearly, and the sleeve 180 comprises the visual position indicator element 132.

This written description uses examples to disclose the various embodiments described herein and also to enable any person skilled in the art to practice the various embodiments, including making and using the adapters and performing the methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A subsea actuation sub-system, comprising:
   - a valve coupled to a subsea structure, the valve having a valve stem for moving the valve between an open position and a closed position;
   - a rotation-to-linear mechanism coupled to the valve stem, the rotation-to-linear mechanism including a shaft with an end for receiving rotational input from a separate retrievable motor actuator;
   - a cylindrical bucket with the shaft positioned therein such that the end is positioned within the bucket, the bucket including a cylindrical opening in an axial direction of the bucket and an elongate opening on a side of the bucket, the cylindrical opening being distal from the rotation-to-linear mechanism, the elongate opening elongated in the axial direction; and
   - a position indicator coupled to the shaft, the position indicator including:
     - a first gear coupled to the shaft, a second gear in threaded communication with the first gear, the second gear configured to move in the axial direction based on rotation of the first gear and the shaft, an element coupled to the second gear, the element extending radially from the second gear, a swing pivotably coupled to the bucket, the swing defining a slot that receives the element, the swing including an indicator that is external to the bucket, wherein the swing and the indicator selectively pivot to a position that corresponds to either the open position or the closed position of the valve based on the rotation of the shaft, a guide coupled to the bucket, the guide defining a slit that receives the swing, wherein the indicator is located on one side of the slit and the slot on another side of the slit.

2. The subsea actuation sub-system of claim 1, wherein the element extends through the elongate opening.

3. The subsea actuation sub-system of claim 2, wherein the first gear is a threaded spindle, and the second gear is a saddle nut positioned around the threaded spindle.

4. The subsea actuation sub-system of claim 2, wherein the first gear and the second gear are within the bucket.

5. The subsea actuation sub-system of claim 1, wherein the guide comprises one or more sensors for sensing at least one of the indicator or the swing.

6. The subsea actuation sub-system of claim 1, wherein the indicator protrudes perpendicular to the swing and is coloured differently from a colour of the swing.

7. The subsea actuation sub-system of claim 1, wherein the guide is coupled to the bucket and the guide supports the swing.

8. The subsea actuation sub-system of claim 1, wherein the first gear is removably coupled to the shaft.

9. The subsea actuation sub-system of claim 1, wherein the element is coupled to the second gear by a screw connection or by a quick connect coupling.

10. A subsea actuation sub-system, comprising:

a valve having a valve stem for moving the valve between an open position and a closed position;

a shaft coupled to the valve stem, the shaft having an end configured to receive rotational input from a separate retrievable motor actuator;

a cylindrical tube with the shaft positioned therein such that the end is positioned within the tube, the tube including a first opening in an axial direction of the tube and a second opening on a side of the tube; and a position indicator coupled to the shaft, the position indicator including:

a first gear coupled to the shaft, a second gear in threaded communication with the first gear, the second gear configured to move in the axial direction based on rotation of the first gear and the shaft, an element coupled to the second gear, the element extending radially from the second gear, a swing pivotably coupled to the tube, the swing defining a slot that receives the element, the swing including an indicator that is external to the tube, wherein the swing and the indicator selectively pivot to a position that corresponds to either the open position or the closed position of the valve based on the rotation of the shaft, a guide coupled to the tube, the guide defining a slit that receives the swing, wherein the indicator is located on one side of the slit and the slot on another side of the slit.

11. The subsea actuation sub-system of claim 10, wherein the element extends through the second opening.

12. The subsea actuation sub-system of claim 11, wherein the first gear is a threaded spindle, and the second gear is a saddle nut positioned around the threaded spindle.

13. The subsea actuation sub-system of claim 11, wherein the first gear and the second gear are within the tube.

14. The subsea actuation sub-system of claim 10, wherein the guide comprises one or more sensors for sensing at least one of the indicator or the swing.

15. The subsea actuation sub-system of claim 10, wherein the indicator protrudes perpendicular to the swing and is coloured differently from a colour of the swing.

16. The subsea actuation sub-system of claim 10, wherein the guide is coupled to the tube and the guide supports the swing.

17. The subsea actuation sub-system of claim 10, wherein the first gear is removably coupled to the shaft.

18. The subsea actuation sub-system of claim 10, wherein the element is coupled to the second gear by a screw connection or by a quick connect coupling.

* * * * *